US010228985B2

(12) United States Patent
Burke et al.

(10) Patent No.: US 10,228,985 B2
(45) Date of Patent: *Mar. 12, 2019

(54) ADJUSTMENT OF A SLEEP DURATION FOR A PROCESS BASED ON AN EXPECTED TIME FOR SECURING A SPINLOCK (71) Applicant: INTERNATIONAL BUSINESS MACHINES CORPORATION, Armonk, NY (US)

(72) Inventors: Seamus J. Burke, Tucson, AZ (US); Trung N. Nguyen, Tucson, AZ (US); Louis A. Rasor, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/803,705

(22) Filed: Nov. 3, 2017

(65) Prior Publication Data

US 2018/0121256 A1 May 3, 2018

Related U.S. Application Data (63) Continuation of application No. 15/332,394, filed on Oct. 24, 2016, now Pat. No. 9,842,010.

(51) Int. Cl.
*G06F 9/52* (2006.01)

(52) U.S. Cl.
CPC ..................... *G06F 9/52* (2013.01)

(58) Field of Classification Search
CPC ............ G06F 9/466; G06F 9/526; G06F 9/52
See application file for complete search history.

(56) References Cited

U.S. PATENT DOCUMENTS

| 5,790,851 | A | * | 8/1998 | Frank ..................... G06F 9/52 718/100 |
| 8,117,600 | B1 | * | 2/2012 | Roeck ................. G06F 11/3632 714/38.1 |
| 8,347,290 | B2 | | 1/2013 | Srinivasan |
| 9,158,596 | B2 | | 10/2015 | Dice |
| 9,223,638 | B2 | | 12/2015 | Hudzia et al. |
| 2008/0184238 | A1 | * | 7/2008 | Ruemmler ............. G06F 9/485 718/102 |
| 2011/0047549 | A1 | * | 2/2011 | Rogers ..................... G06F 9/50 718/100 |
| 2011/0185154 | A1 | | 7/2011 | Stellwag |

(Continued)

OTHER PUBLICATIONS

J. Ouyang, et al., "Preemptable Ticket Spinlocks: Improving Consolidated Performance in the Cloud", ACM 978-1-4503-1266-0/13/03, VEE'13, Mar. 16-17, 2013, Houston, Texas, pp. 10.

(Continued)

*Primary Examiner* — Nimesh G Patel
(74) *Attorney, Agent, or Firm* — Rabindranath Dutta; Konrad Raynes Davda & Victor LLP (57) ABSTRACT A computational device maintains a spinlock for exclusive access of a resource by a process of a plurality of processes. In response to determining by the process that a turn for securing the spinlock has not arrived for the process, a sleep duration is determined for the process, prior to making a next attempt to secure the spinlock.

18 Claims, 8 Drawing Sheets (56) References Cited

U.S. PATENT DOCUMENTS

2011/0296028 A1* 12/2011 Sasaoka .................. G06F 9/526
  709/226
2012/0304185 A1* 11/2012 Horikawa ............... G06F 9/526
  718/102
2014/0351231 A1   11/2014  McKenney
2015/0019517 A1    1/2015  Wang
2015/0286586 A1   10/2015  Yadav
2015/0355953 A1   12/2015  McKenney
2016/0041852 A1    2/2016  Suarez Gracia et al.

OTHER PUBLICATIONS

U.S. Appl. No. 15/332,394, filed Oct. 24, 2016.
Office Action dated Mar. 24, 2017, pp. 14, for U.S. Appl. No. 15/332,394, filed Oct. 24, 2016.
Response dated Jun. 26, 2017, pp. 10, to Office Action dated Mar. 24, 2017, pp. 14, for U.S. Appl. No. 15/332,394, filed Oct. 24, 2016.
Notice of Allowance dated Aug. 3, 2017, pp. 5, for U.S. Appl. No. 15/332,394, filed Oct. 24, 2016.
List of IBM Patents or Patent Applications Treated as Related, dated Nov. 3, 2017, pp. 2.

* cited by examiner

ADJUSTMENT OF A SLEEP DURATION FOR A PROCESS BASED ON AN EXPECTED TIME FOR SECURING A SPINLOCK

CROSS-REFERENCE TO RELATED APPLICATION

This application is a continuation of U.S. patent application Ser. No. 15/332,394, filed Oct. 24, 2016, which application is incorporated herein by reference in its entirety.

BACKGROUND

1. Field

Embodiments relate to an adjustment of a sleep duration for a process based on an expected time for securing a spinlock.

2. Background

A computational device may include a plurality of processors and form a multiprocessing system. The plurality of processors may be referred to as cores, where each core may comprise a central processing unit (CPU). Processes or threads may be executed in parallel in the plurality of cores of the computational device. Both processes and threads are independent sequences of execution. The difference is that threads (of the same process) run in a shared memory space, while processes run in separate memory spaces.

A lock is a synchronization mechanism for enforcing limits on access to a resource in an environment where there are many threads of execution. A lock is designed to enforce a mutual exclusion concurrency control policy. Some locking mechanisms block the execution of the thread (or process) requesting the lock until the thread is allowed to access the locked resource. With a spinlock, the thread simply waits ("spins") until the lock becomes available.

A ticket lock is a type of spinlock that uses "tickets" to control which thread of execution (or process) is allowed to enter a critical section. A ticket lock is a first in first out (FIFO) queue-based mechanism. Threads may be assigned sequentially numbered tickets as they are created. A thread is permitted to enter the critical section when its ticket number is being served, where the critical section is a part of a program where a protected shared resource is accessed, and where the critical section cannot be executed by more than one thread at the same time.

SUMMARY OF THE PREFERRED EMBODIMENTS

Provided are a method, a system, and a computer program product in which a computational device maintains a spinlock for exclusive access of a resource by a process of a plurality of processes. In response to determining by the process that a turn for securing the spinlock has not arrived for the process, a sleep duration is determined for the process, prior to making a next attempt to secure the spinlock.

In certain embodiments, the plurality of processes are assigned sequential ticket numbers, wherein the plurality of processes secure the spinlock in sequence, based on the sequentially assigned ticket numbers.

In further embodiments, the sleep duration for the process is based on when the process is likely to secure the spinlock based on a ticket number of the process.

In additional embodiments, the process undergoes spinning for a predetermined number of processor cycles and a determination is made of how many tickets have been processed during the predetermined number of processor cycles. A time duration to process a ticket is determined based on determining how many tickets have been processed during the predetermined number of processor cycles. The sleep duration for the process is determined based on a number of tickets remaining to be processed for securing the spinlock for the process, and the time duration to process a ticket.

In yet additional embodiments, the sleep duration for the process is also based on a sleep overhead time.

In certain embodiments, the process sleeps, in response to the sleep duration for the process being greater than a predetermined threshold amount of time.

In further embodiments, the process waits for the spinlock while spinning, in response to the sleep duration for the process being less than or equal to the predetermined threshold amount of time.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Locks to protect data structures and critical sections may be available in programs that run in a computational device. While a lock is being held by a process, if other processes need to acquire the lock, typically the other processes may spin for the lock. While spinning for the lock, the other processes perform no useful operations and waste CPU cycles. There is a need to minimize these wasted CPU cycles and allow other processes to run.

Certain operating systems provide a spinlock that allows a process to go to sleep if the lock cannot be obtained. The process spins for a short amount of time and then sleeps if the process is unable to secure the lock. However, the duration of time the process should sleep is unknown. When the process that holds the lock exits the critical section and releases the lock, the process wakes up any processes that are sleeping on the lock. The processes that wake up are able spin for the lock to acquire the lock. This may cause the release of the lock to take longer, impacting the process that was running with the lock and is now attempting to release the lock.

Certain embodiments provide mechanisms in which a process spins for a lock for a certain number of cycles. If the lock is not obtained, then the process calculates how long to sleep based on the rate at which tickets are being served and how far away the ticket value of the process is from the current ticket value being processed. This is repeated when the process wakes up, until the lock is obtained.

Certain embodiments provide an adaptive ticket locking mechanism to maximize CPU usage, where a process that desires a lock is allowed to spin for a predetermined number of CPU cycles and if no lock is obtained during that time, a conservative determination is made of the amount of time it is likely to take to secure a lock. This determination may be based on the number of tickets served during the predetermined number of CPU cycles, and how many tickets need to be processed before the ticket of the process can be processed. The process is allowed to sleep for the amount of time it is likely to take to secure the lock, after which the process attempts to secure the lock again. No extra overhead to wake up other processes is placed on the process that releases the lock.

Exemplary Embodiments

Figure 1:
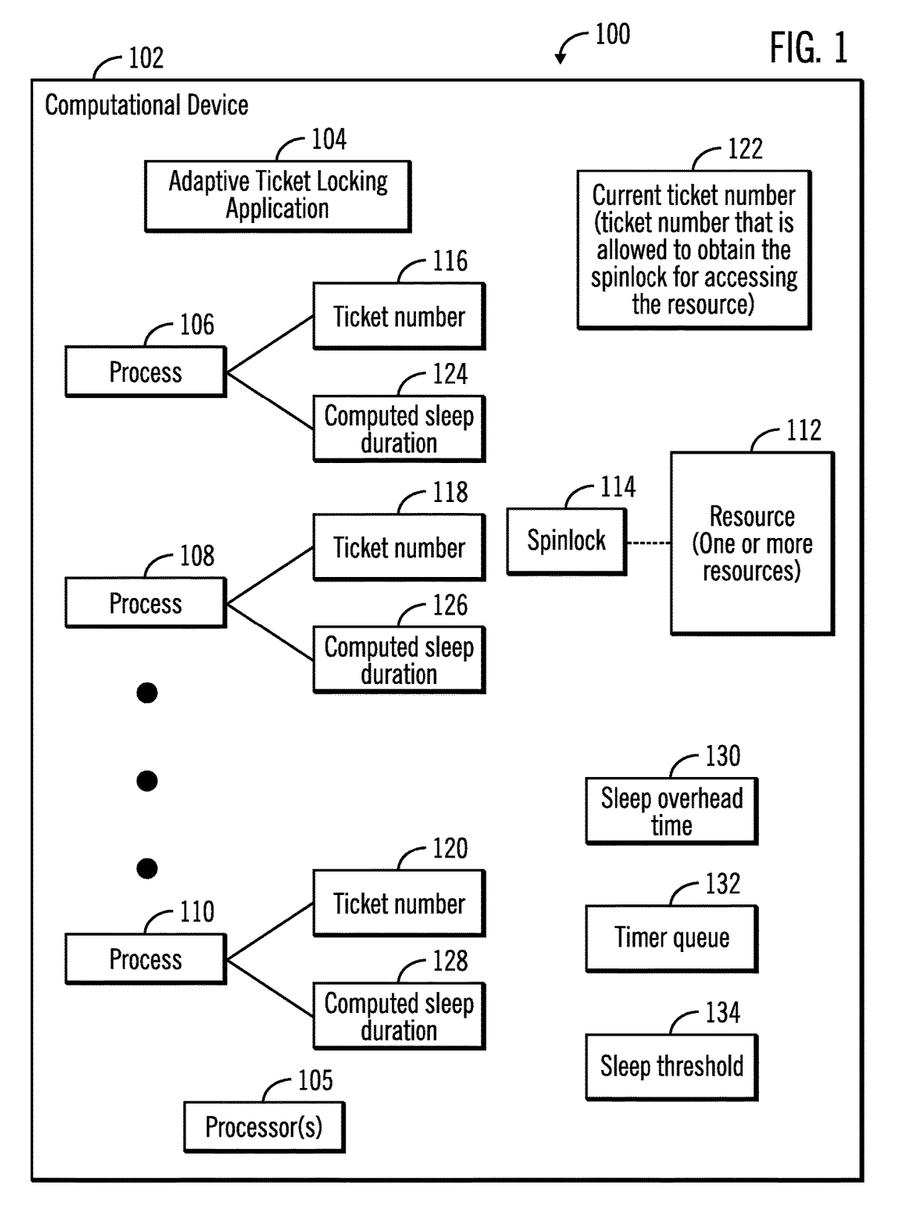
FIG. 1 illustrates a block diagram of computational device in which an adaptive ticket locking application is implemented, in accordance with certain embodiments.

FIG. 1 illustrates a block diagram of a computing environment 100 comprising a computational device 102. The computational device 102 may comprise any suitable computational device including those presently known in the art, such as, a personal computer, a workstation, a server, a mainframe, a hand held computer, a palm top computer, a telephony device, a network appliance, a blade computer, a processing device, a controller, a storage server, a dual-server storage system, etc. The computational device 102 may be included in any suitable network, such as, a storage area network, a wide area network, the Internet, an intranet. In certain embodiments, the computational device 102 may be an element in a cloud computing environment.

An adaptive ticket locking application 104 may execute in the computational device 102 that has one or more processors 105, where the adaptive ticket locking application 104 is an application that may be implemented in software, firmware, hardware or any combination thereof.

A plurality of processes 106, 108, 110 may attempt to exclusively acquire a resource 112 by acquiring a spinlock 114 in the computational device 102. The adaptive ticket locking application 104 provides sequential ticket numbers to the processes 106, 108, 110 as the processes 106, 108, 110 first make a request to acquire the spinlock 114 for exclusive access to the resource 112. For example, if the process 106 is the first process to request the spinlock 114, the process 106 may be provided a ticket number 116, where the ticket number 116 has a value of one. If the process 108 is the second process to request the spinlock 114, the process 108 may be provided a ticket number 118, where the ticket number 118 has a value of two. If the process 110 is the third process to request the spinlock 114, the process 110 may be provided a ticket number 120, where the ticket number 120 has a value of three.

The adaptive ticket locking application 104 keeps track of the value of the ticket number indicating whose turn it is to acquire the spinlock 114, in a data structure referred to as the current ticket number 122. Initially, the current ticket number 122 is one. Each time a process releases the spinlock, the value of the current ticket number 122 is incremented by one, and the process that has the ticket number equal to the value of the current ticket number 122 is then eligible to acquire the spinlock 114.

In certain embodiments, when a process is unable to acquire the spinlock 114 because the turn of the ticket number of the process has not yet arrived, based on the value of the current ticket number 122, the adaptive ticket locking application 104 computes a sleep duration 124, 126, 128 for the process, where the computed sleep duration is an estimate of the time the process should sleep before the process wakes up and attempts to acquire the spinlock 114. As a result, cycles of the processors 105 may be used more efficiently, since the processes 106, 108, 110 do not use the cycles of the processors 105 while the processes 106, 108, 110 are sleeping.

A data structure referred to as "sleep overhead time" 130 stores the sum of the time for a process to be queued on a timer queue 132, and the time for the queued process to be dispatched from the timer queue 132. The adaptive ticket locking application 104 uses the sleep overhead time 130 while computing the sleep durations 124, 126, 128 to account for the time needed for a process to be queued to the timer queue 132 and the time needed for the queued process to be dispatched from the timer queue 132. A data structure referred to as "sleep threshold" 134 stores the minimum computed sleep duration of a process at which the process is allowed to sleep. Placing a process in a sleep mode for a duration less than the sleep threshold 134 may not improve system performance because of the overhead time spent to put the process to sleep and then to wake up the process.

Figure 2:
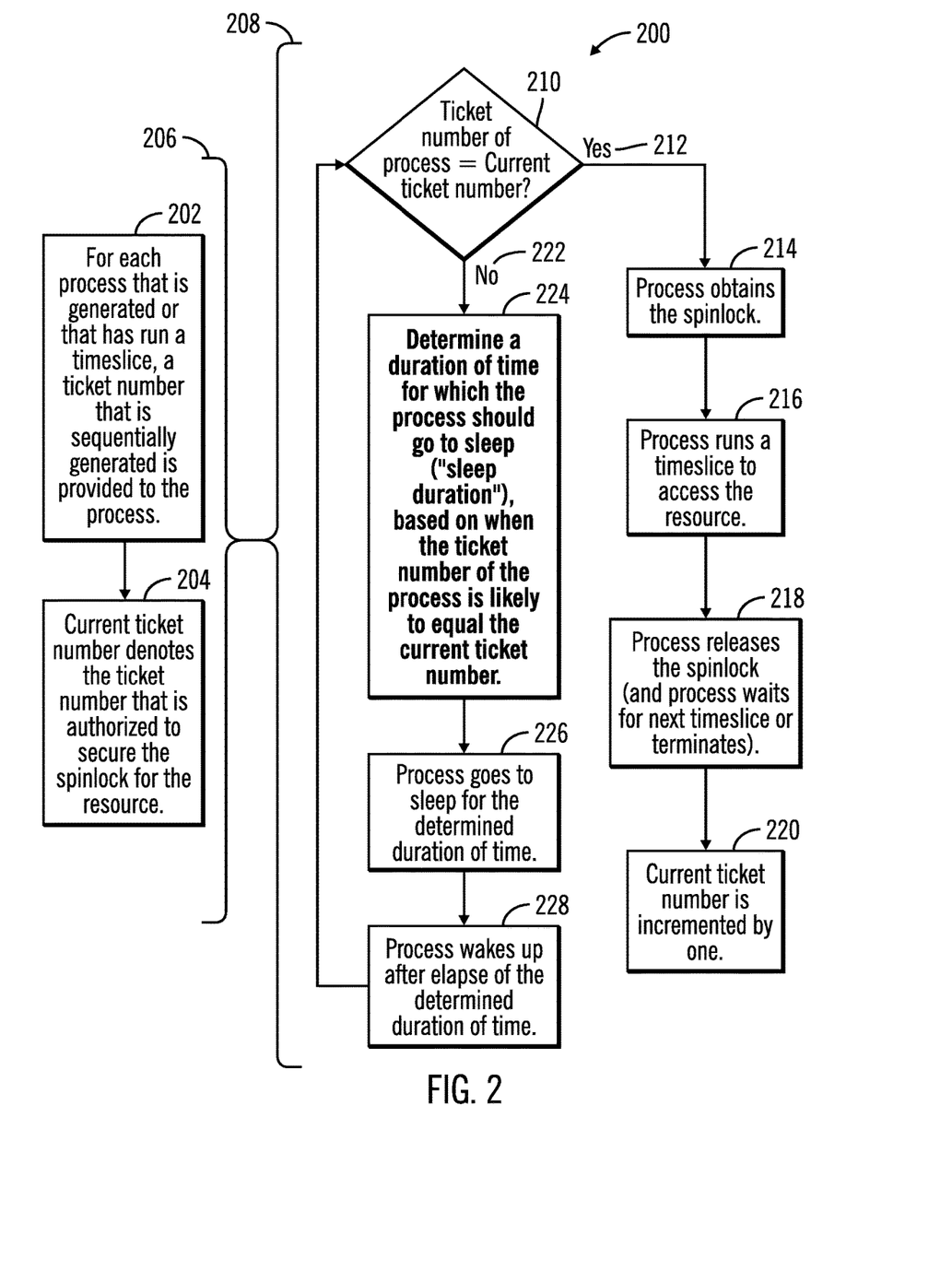
FIG. 2 illustrates a first flowchart to adjust a sleep duration for a process, based on an expected time for securing a spinlock, in accordance with certain embodiments.

FIG. 2 illustrates a first flowchart 200 to adjust a sleep duration for a process, based on an expected time for securing a spinlock, in accordance with certain embodiments. The operations shown in FIG. 2 may be performed under the control of the adaptive ticket locking application 104 that executes in the computational device 102.

Control starts at block 202 in which for each process that is generated or that has run a timeslice, a ticket number that is sequentially generated is provided to the process, where block 204 shows that a current ticket number 122 denotes the ticket number that is authorized to secure the spinlock 114 for the resource 112.

In parallel with the operations shown in blocks 202, 204 that are also indicated via braces 206, the operations indicated via braces 208 are performed. The operations indicated via braces 208 are initiated in block 210 in which a determination is made as to whether the ticket number of a process equals the current ticket number 122. If so ("Yes" branch 212) then the process obtains the spinlock 114 (at block 214). Control proceeds to block 216 in which the process runs a timeslice to access the resource 112. Once the timeslice is over, the process releases (at block 218) the spinlock 114, and then the process waits for the next timeslice or terminates. From block 218 control proceeds to block 220 where the current ticket number 122 is incremented.

If at block 210 a determination is made that the ticket number of the process is not equal to the current ticket number 122 ("No" branch 222), then control proceeds to block 224 in which the adaptive ticket locking application 104 determines the duration of time for which the process should go to sleep ("sleep duration"), based on when the ticket number of the process is likely to equal the current ticket number 122. The process goes to sleep for the determined duration of time (at block 226), and wakes up (at block 228) on its own after the elapse of the determined duration of time. From block 228 control proceeds to block 210, where the process (after waking up) determines whether the ticket number of the process equals the current ticket number 122.

Figure 3:
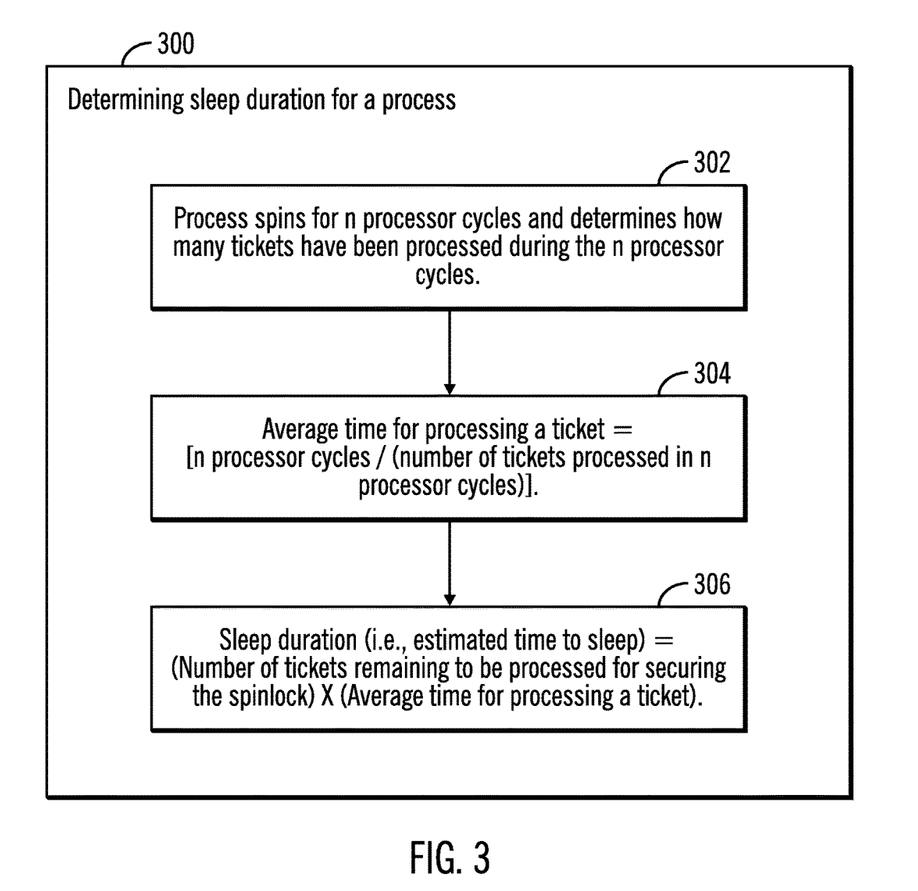
FIG. 3 illustrates a second flowchart to determine the sleep duration of a process, based on an expected time for securing a spinlock, in accordance with certain embodiments.

FIG. 3 illustrates a second flowchart 300 to determine the sleep duration for a process, based on an expected time for securing a spinlock, in accordance with certain embodiments. The operations shown in FIG. 3 may be performed under the control of the adaptive ticket locking application 104 that executes in the computational device 102.

To determine the sleep duration for a process, the adaptive ticket locking application 104 makes the process spin for n processor cycles and determines (at block 302) how many tickets have been processed during the n processor cycles. For example, the process spins for 2000 processor cycles and determines that 4 tickets have been processed in the 2000 processor cycles (i.e., the value of the current ticket number 122 has advanced by 4 in the 2000 processor cycles).

Control proceeds to block 304, in which the average time (i.e., number of processor cycles) of processing a ticket is calculated to be the "n processor cycles" divided by "the number of tickets processed in then processor cycles". For example, if 4 tickets have been processed in 2000 processor cycles, then the average time for processing a ticket is 500 processor cycles (as 2000 divided by 4 is 500).

From block 304 control proceeds to block 306 in which the sleep duration (i.e., the estimated time to sleep in processor cycles) for the process is computed to be the product of the number of tickets remaining to be processed for securing the spinlock and the average time for processing a ticket. For example, if the ticket number of the process is 30 and the current ticket number is 20, then the number of tickets remaining to be processed for securing the spinlock is 10 (as 30−20=10). If the average time for processing a ticket has been computed as 500 processor cycles in block 304, then the sleep time for the process is 5000 processor cycles (as 10×500=5000).

Therefore, FIG. 3 illustrates embodiments in which a process is made to spin for a predetermined number of processor cycles to estimate the average processing time for a ticket. Then an estimate is made of the amount of processor cycles to sleep, based on the how many tickets need to be processed before the turn of the process to acquire the spinlock is reached.

Figure 4:
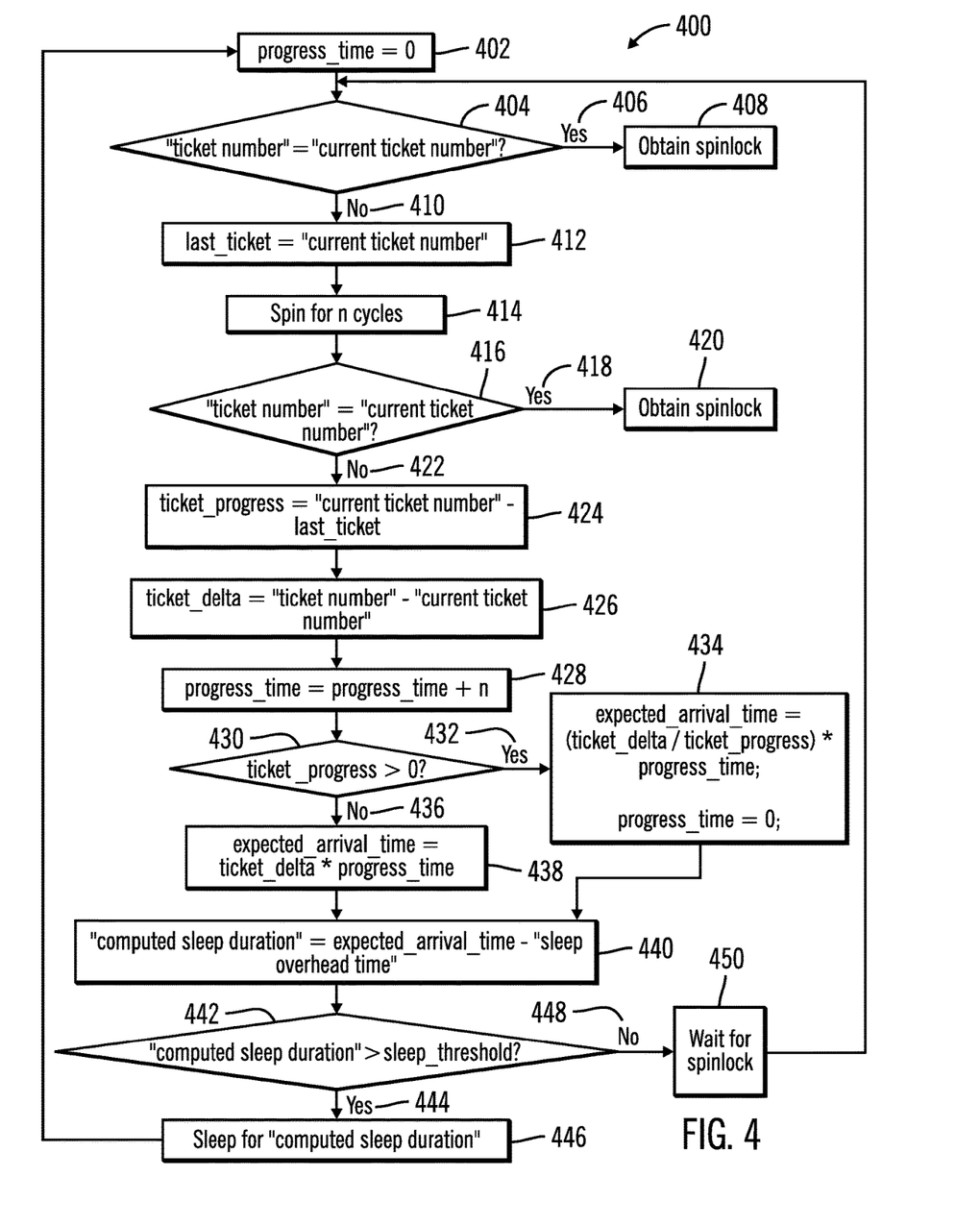
FIG. 4 illustrates a third flowchart to adjust a sleep duration for a process, based on an expected time for securing a spinlock, in accordance with certain embodiments.

FIG. 4 illustrates a third flowchart 400 to adjust a sleep duration for a process, based on an expected time for securing a spinlock, in accordance with certain embodiments. The operations shown in FIG. 4 may be performed under the control of the adaptive ticket locking application 104 that executes in the computational device 102.

Control starts at block 402 in which a variable "progress_time" is set to zero, where the variable "progress_time" denotes the number of processing cycles that have elapsed. It should be noted that time may be measured in number of processor cycles or via some other unit, such as seconds, milliseconds, microseconds, etc. Control proceeds to block 404 in which the adaptive ticket locking application 104 determines for a process (e.g. process 106) whether the "ticket number" 116 for the process 106 equals the "current ticket number" 122. If so ("yes" branch 406), control proceeds to block 408 in which the process 106 acquires the spinlock 114 for accessing the resource 112.

If at block 404 the adaptive ticket locking application 104 determines that the "ticket number" 116 for the process 106 does not equal the "current ticket number" 122 ("No" branch 410), then control proceeds to block 412 in which a variable "last_ticket" is set to the "current ticket number" 122, and the process 106 is made to spin for n cycles (at block 414).

Control proceeds to block 416 in which a determination is made as to whether the "ticket number" 116 for the process 106 equals the "current ticket number" 122. If so ("yes" branch 418), control proceeds to block 420 in which the process 106 acquires the spinlock 114 for accessing the resource 112.

If at block 416 a determination that the "ticket number" 116 for the process 106 does not equal ("no" branch 422) the "current ticket number" 122, then control proceeds to block 424 in which the variable "ticket_progress" is set to the difference between the "current ticket number" 122 and the "last_ticket". The "ticket_progress" indicates how many tickets have been processed while the spinning for n cycles (shown in block 414) was being performed.

From block 424 control proceeds to block 426 in which the variable "ticket_delta" is set to be the difference of "ticket number" 116 of the process 106 and the "current ticket number" 122, where ticket_delta indicates how many tickets need to be processed before the turn of the process 106 is reached to secure the spinlock 114.

Control proceeds to block 428 in which the variable "progress_time" is incremented by n to indicate the completion of the spinning for n cycles started at block 414. The progress_time indicates the number of processor cycles the process 106 has been spinning.

At block 430, a determination is made as to whether the variable "ticket_progress" is greater than zero (i.e., one or more tickets have been processed during the n cycles during which the process 106 was spinning). If so ("Yes" branch 432), the expected_arival_time is set to be the product of (ticket_delta/ticket_progress) and the progress_time, and then the progress_time is set to zero (at block 434).

If at block 430 a determination is made that ticket_progress is not greater than zero ("No" branch 436) then control proceeds to block 438 where the expected_arrival_time is set to the product of the ticket_delta and the progress_time (i.e., when no tickets get processed in the n cycles, then it is empirically determined that each ticket would on an average take at least the progress_time amount of time to run, and the expected_arrival_time is computed based on the number of tickets remaining to be processed and the time to process each ticket From blocks 434 and block 438 control proceed to block 440 in which the "computed sleep duration" 124 is computed to be the difference between the expected_arrival_time and the "sleep overhead time" 130, where the sleep overhead time 130 is the time needed to queue a process to the timer queue 132 and the time needed to dispatch the queued process from the timer queue 132. A determination is made (at block 442) if the "computed sleep duration" 124 is greater than the "sleep threshold", and if so ("yes" branch 444), the process 106 is made to sleep for the "computed sleep duration" 124 (at block 446) and control returns to block 402. If at block 442, the "computed sleep duration" is not greater than the sleep_threshold ("no" branch 448), then the process waits (at block 450) for the spinlock 114 and the control returns to block 404.

Therefore, in FIG. 4, a process is made to sleep only if the computed sleep duration 124 is greater than the sleep threshold 134, in order to avoid the overhead of putting a process to sleep and waking up the process. For example, a sleep threshold 134 may be set to 1 millisecond (or a predetermined number of processor cycles) and until the calculated sleep duration 124 is at least 1 millisecond, the process 106 is not made to sleep. Additionally, the computed sleep duration 124 is the estimated time remaining to secure the ticket adjusted for a sleep overhead time to avoid the overhead time for adding the process to a queue and removing from the process from the queue.

It should be noted that FIG. 4 shows one embodiment for determining the computed sleep duration 124, and other embodiments may determine the computed sleep duration 124 via other mechanisms.

Figure 5:
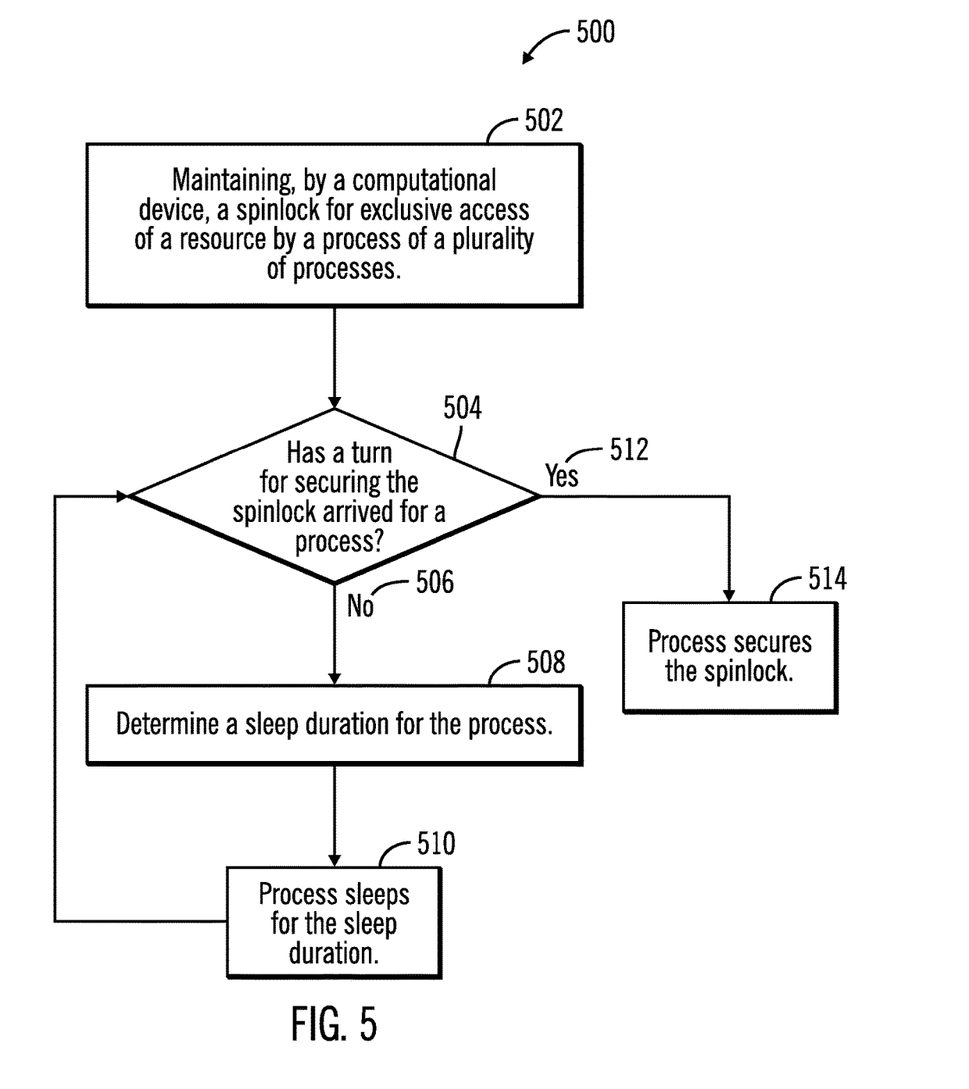
FIG. 5 illustrates a fourth flowchart to adjust a sleep duration for a process, based on an expected time for securing a spinlock, in accordance with certain embodiments.

FIG. 5 illustrates a fourth flowchart 500 to adjust a sleep duration for a process, based on an expected time for securing a spinlock, in accordance with certain embodiments. The operations shown in FIG. 5 may be performed under the control of the adaptive ticket locking application 104 that executes in the computational device 102.

Control starts at block 502 in which a computational device 102 maintains (i.e., stores in a data structure and updates the data structure as necessary) a spinlock 114 for exclusive access of a resource 112 by a process of a plurality of processes 106, 108, 110. For the purposes of this disclosure the term processes includes threads and other similar constructs. Control proceeds to block 504 in which a determination is made as to whether the turn for securing the spinlock 114 has arrived for the process. In response to determining by the process that a turn for securing the spinlock has not arrived for the process ("No" branch 506), a sleep duration is determined (at block 508) for the process, and the process sleeps (at block 510) for the sleep duration, prior to making a next attempt to secure the spinlock 114 by returning to block 504.

In response to determining (at block 504) by the process that a turn for securing the spinlock 114 has arrived for the process ("Yes" branch 512) control proceeds to block 514 where the process secures the spinlock 114.

Therefore, FIG. 1-5 illustrate certain embodiments in which a sleep duration 124 is computed for a process 106 that is attempting to acquire a spinlock, instead of continuously spinning and wasting processor cycles. The process 106 is made to sleep for the sleep duration 124 prior to waking up and attempting to acquire the spinlock 114 once again. The sleep duration 124 for the process 106 is based on when the process 106 is likely to secure the spinlock 114, based on a ticket number 116 of the process 106 and the current ticket number 122 that is being processed. In certain embodiments, the process 106 undergoes spinning for a predetermined number of processor cycles (e.g., n processor cycles) and a determination is made of how many tickets have been processed during the predetermined number of processor cycles. An average time duration to process a ticket is determined based on determining how many tickets have been processed during the predetermined number of processor cycles. The sleep duration for the process 106 is determined based on a number of tickets remaining to be processed for securing the spinlock for the process 106 and the average time duration to process a ticket.

In yet additional embodiments, the sleep duration for the process 106 is also based on a sleep overhead time 130. In certain embodiments, the process 106 sleeps, in response to the computed sleep duration 124 for the process 106 being greater than a predetermined threshold amount of time ("sleep threshold" 134). In further embodiments, the process 106 waits for the spinlock 114 while spinning, in response to the calculated sleep duration 124 for the process 106 being less than or equal to the predetermined threshold amount of time.

Therefore, FIG. 1-5 illustrate certain embodiments for adjusting the sleep duration of a process based on the expected time that is remaining to secure the spinlock for exclusive access of a resource.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 6:
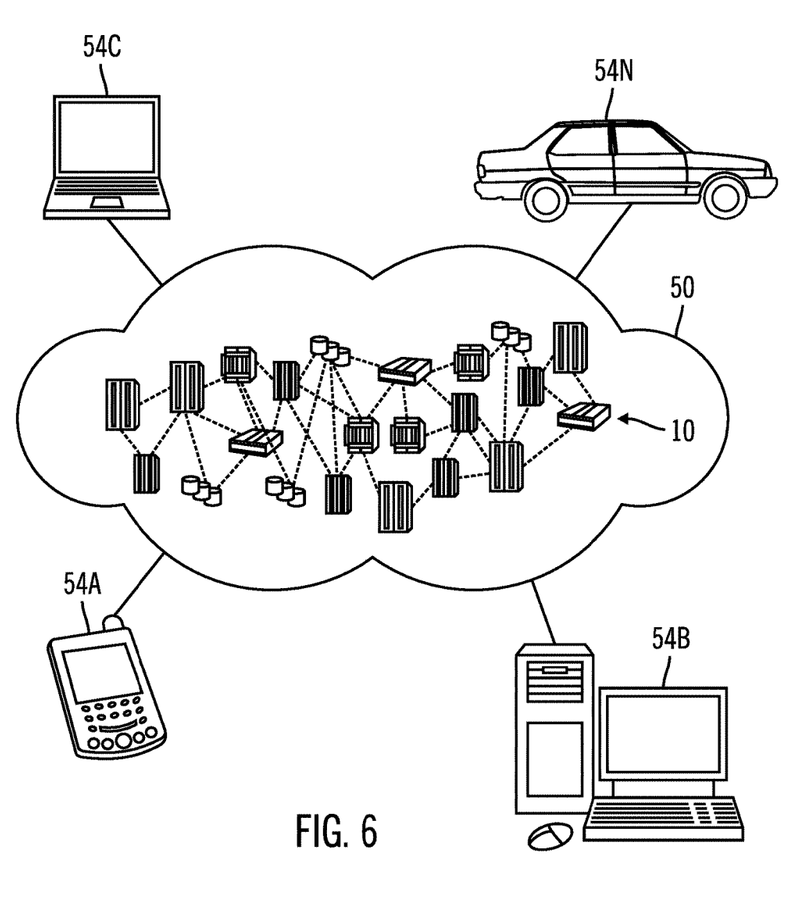
FIG. 6 illustrates a block diagram of a cloud computing environment, in accordance with certain embodiments.

Referring now to FIG. 6, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
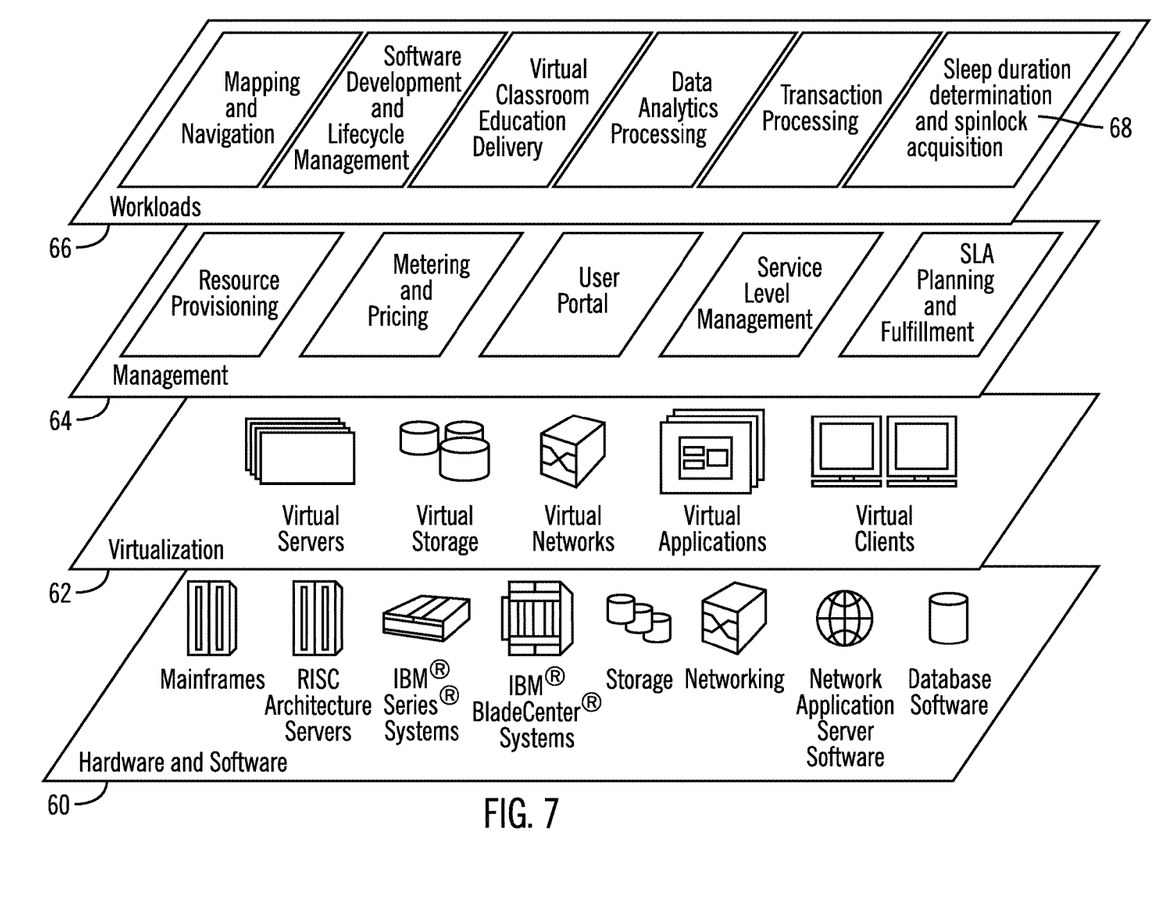
FIG. 7 illustrates a block diagram of further details of the cloud computing environment of FIG. 6, in accordance with certain embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the spin duration determination and spinlock acquisition 68 as shown in FIGS. 1-6.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 8:
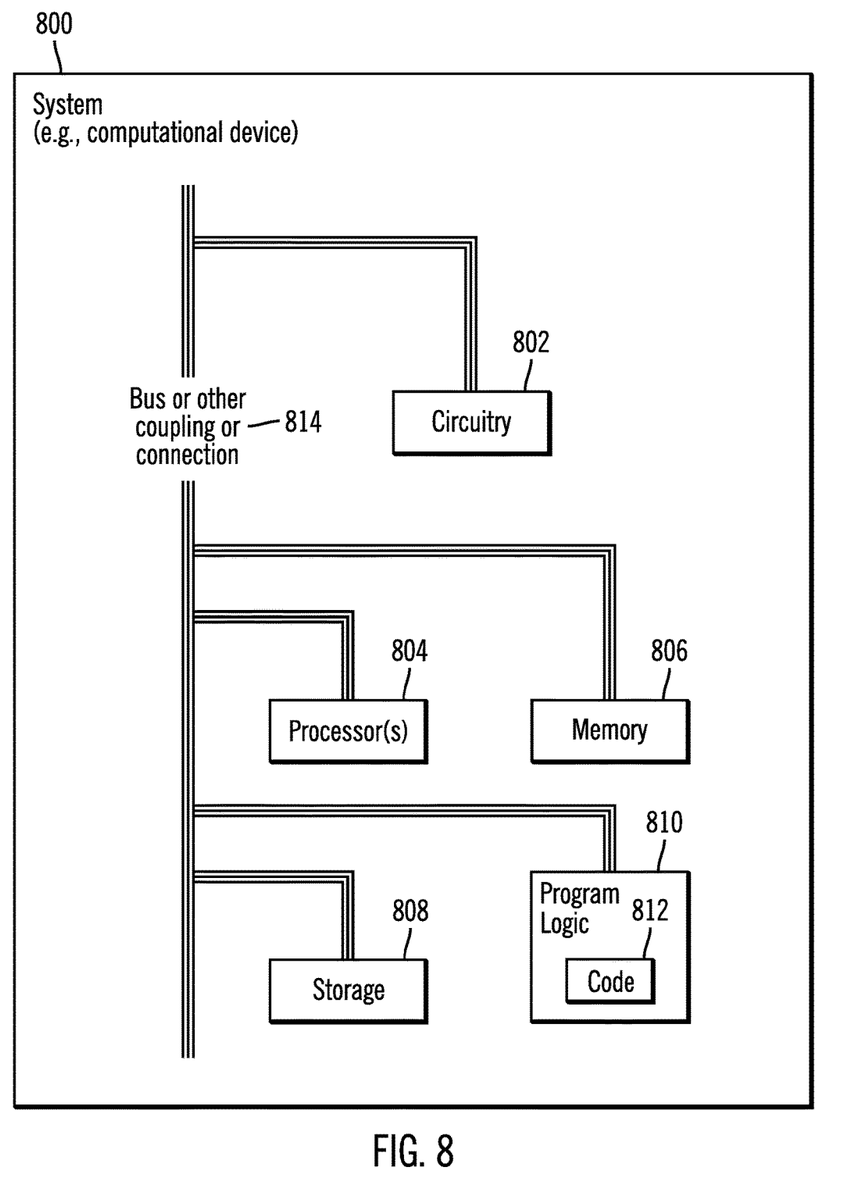
FIG. 8 illustrates a block diagram of a computational system that shows certain elements that may be included in the computational device described in FIG. 1, in accordance with certain embodiments.

FIG. 8 illustrates a block diagram that shows certain elements that may be included in the computational device 102, in accordance with certain embodiments. The system 800 may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. One or more of the components in the system 800 may communicate via a bus or via other coupling or connection 814. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

maintaining, by a computational device, a spinlock for exclusive access of a resource by a process of a plurality of processes; and in response to determining by the process that a turn indicated by a ticket number of the process for securing the spinlock has not arrived for the process, determining a sleep duration for the process based on a number of tickets remaining to be processed for securing the spinlock and an average time duration to process a ticket; and entering, by the process, a sleep mode the sleep duration.

2. The method of claim 1, wherein the sleep duration is determined prior to making a next attempt to secure the spinlock.

3. The method of claim 1, wherein the a sleep duration for the process is determined based on computing a product of a number of tickets remaining to be processed for securing the spinlock for the process, and an average time duration to process a ticket.

4. The method of claim 1, wherein the determining of the sleep duration for the process further comprises:

spinning the process for a predetermined number of processor cycles and determining how many tickets have been processed during the predetermined number of processor cycles; and determining the average time duration to process a ticket based on determining how many tickets have been processed during the predetermined number of processor cycles.

5. The method of claim 1, wherein the plurality of processes are assigned sequential ticket numbers.

6. The method of claim 5, wherein the plurality of processes secure the spinlock in sequence, based on the sequentially assigned ticket numbers, and wherein the process is permitted to enter a critical section is which a shared resource is accessed, in response to arriving of the turn indicated by the ticket number of the process.

7. A system, comprising:

a memory;

a processor coupled to the memory, wherein the processor performs operations, the operations comprising:

maintaining a spinlock for exclusive access of a resource by a process of a plurality of processes; and in response to determining by the process that a turn indicated by a ticket number of the process for securing the spinlock has not arrived for the process, determining a sleep duration for the process based on a number of tickets remaining to be processed for securing the spinlock and an average time duration to process a ticket; and entering, by the process, a sleep mode the sleep duration.

8. The system of claim 7, wherein the sleep duration is determined prior to making a next attempt to secure the spinlock.

9. The system of claim 7, wherein the a sleep duration for the process is determined based on computing a product of a number of tickets remaining to be processed for securing the spinlock for the process, and an average time duration to process a ticket.

10. The system of claim 7, wherein the determining of the sleep duration for the process further comprises:

spinning the process for a predetermined number of processor cycles and determining how many tickets have been processed during the predetermined number of processor cycles; and determining the average time duration to process a ticket based on determining how many tickets have been processed during the predetermined number of processor cycles.

11. The system of claim 7, wherein the plurality of processes are assigned sequential ticket numbers.

12. The system of claim 11, wherein the plurality of processes secure the spinlock in sequence, based on the sequentially assigned ticket numbers, and wherein the process is permitted to enter a critical section is which a shared resource is accessed, in response to arriving of the turn indicated by the ticket number of the process.

13. A computer program product, the computer program product comprising a computer readable storage medium having computer readable program code embodied therewith, the computer readable program code configured to perform operations, the operations comprising:

maintaining a spinlock for exclusive access of a resource by a process of a plurality of processes; and in response to determining by the process that a turn indicated by a ticket number of the process for securing the spinlock has not arrived for the process, determining a sleep duration for the process based on a number of tickets remaining to be processed for securing the spinlock and an average time duration to process a ticket; and entering, by the process, a sleep mode the sleep duration.

14. The computer program product of claim 13, wherein the sleep duration is determined prior to making a next attempt to secure the spinlock.

15. The computer program product of claim 13, wherein the a sleep duration for the process is determined based on computing a product of a number of tickets remaining to be processed for securing the spinlock for the process, and an average time duration to process a ticket.

16. The computer program product of claim 13, wherein the determining of the sleep duration for the process further comprises:

spinning the process for a predetermined number of processor cycles and determining how many tickets have been processed during the predetermined number of processor cycles; and determining the average time duration to process a ticket based on determining how many tickets have been processed during the predetermined number of processor cycles.

17. The computer program product of claim 13, wherein the plurality of processes are assigned sequential ticket numbers.

18. The computer program product of claim 17, wherein the plurality of processes secure the spinlock in sequence, based on the sequentially assigned ticket numbers, and wherein the process is permitted to enter a critical section is which a shared resource is accessed, in response to arriving of the turn indicated by the ticket number of the process.

* * * * *